US012661881B2

(12) United States Patent
Wu

(10) Patent No.: US 12,661,881 B2
(45) Date of Patent: Jun. 23, 2026

(54) METHOD OF MAKING MOUSE PAD

(71) Applicant: Tsung-Lin Wu, Taichung City (TW)

(72) Inventor: Tsung-Lin Wu, Taichung City (TW)

( * ) Notice: Subject to any disclaimer, the term of this patent is extended or adjusted under 35 U.S.C. 154(b) by 120 days.

(21) Appl. No.: 18/772,186

(22) Filed: Jul. 14, 2024

(65) Prior Publication Data

US 2025/0083432 A1     Mar. 13, 2025

(30) Foreign Application Priority Data

Sep. 8, 2023     (TW) ................................. 112134304

(51) Int. Cl.
*B32B 37/18*         (2006.01)
*B32B 37/06*         (2006.01)
*B32B 37/10*         (2006.01)
*B32B 38/00*         (2006.01)
(52) U.S. Cl.
CPC ............ *B32B 37/182* (2013.01); *B32B 37/06* (2013.01); *B32B 37/10* (2013.01); *B32B 38/0004* (2013.01); *B32B 38/145* (2013.01); *B32B 2305/18* (2013.01); *B32B 2375/00* (2013.01)
(58) Field of Classification Search
CPC ....... B32B 37/182; B32B 37/06; B32B 37/10; B32B 38/0004; B32B 38/145; B32B 2305/18; B32B 2375/00
See application file for complete search history.

(56) References Cited

U.S. PATENT DOCUMENTS

2009/0152427 A1*  6/2009  Kuo ..................... A47G 1/0633
                                                        248/346.01
2017/0326857 A1*  11/2017  Weedlun .................. B32B 7/12

FOREIGN PATENT DOCUMENTS

CN         106626688 A  *  5/2017  ............. B32B 37/24

OTHER PUBLICATIONS

JR Automation; YouTube Video—"Heated Edgefold Upholstering & Trim Press | JR Automation | Product Demonstrations"; dated Jul. 19, 2017 Accessed at <https://www.youtube.com/watch?v= xSj0XJQaWdk> (Year: 2017).*

* cited by examiner

*Primary Examiner* — Alex B Efta
*Assistant Examiner* — Alexander S Wright
(74) *Attorney, Agent, or Firm* — LANWAY IPR SERVICES; Chun-Ming Shih

(57)          ABSTRACT

A method of making a mouse pad contains: bonding and hot-press molding a body and a cloth by using a first mold and a second mold. The body is made of polyurethane (PU), the second mold includes a cavity, and a size of the cavity of the second mold is equal to a predetermined size of the body, and a guide rib surrounds the cavity. The method comprising steps of: 1) flattening the body; 2) bonding the cloth on the body; 3) cutting the body in a predetermined; 4) hot-press molding the body and the cloth; 5) sublimation printing; and 6) hot-press molding to trim the mouse pad by using the first mold and of the guide rib the second mold.

8 Claims, 15 Drawing Sheets flattening a material
(such as polyurethane);

adhering the fabric layer
(made knitted fabric or plain woven fabric);

cutting in the predetermined;

hot pressing the polyurethane
(in 120°C to 300°C);

sublimation printing; and hot-press molding to trim the body
(in 120°C to 300°C).

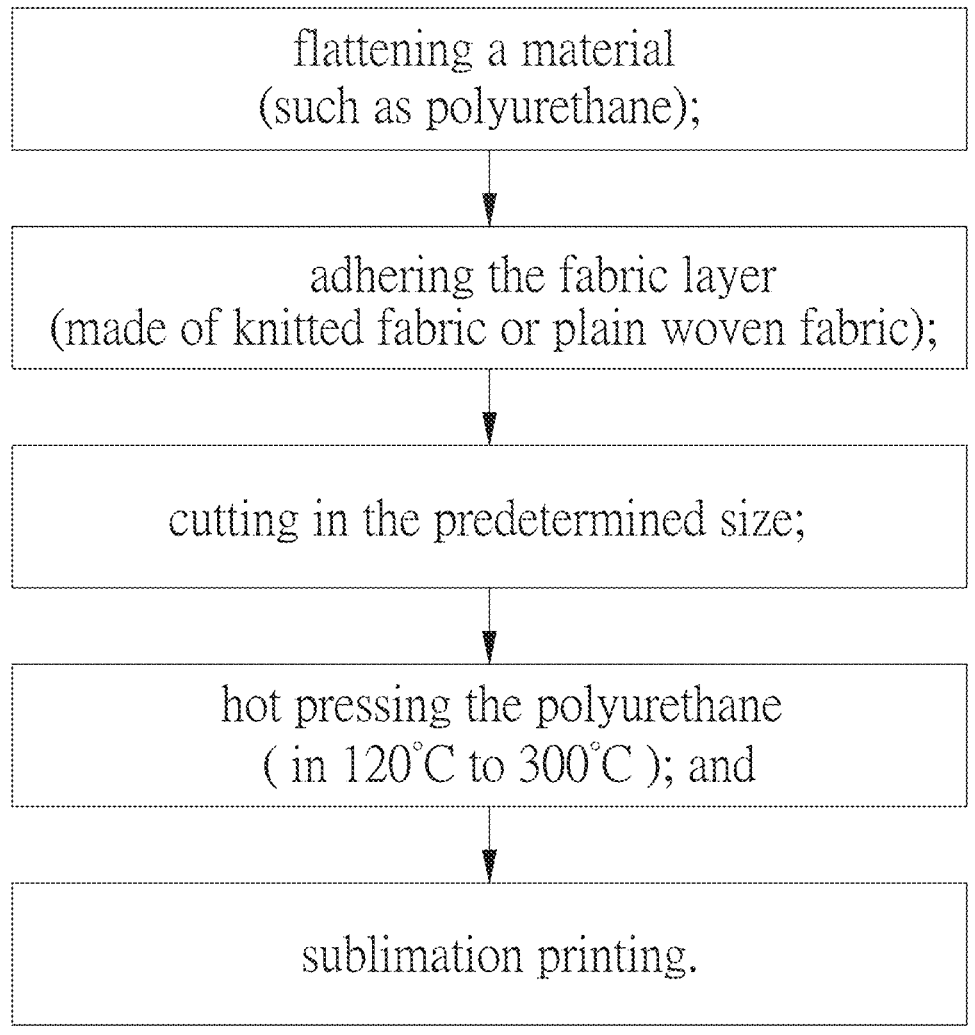
flattening a material
(such as polyurethane);
↓
adhering the fabric layer
(made of knitted fabric or plain woven fabric);
↓
cutting in the predetermined size;
↓
hot pressing the polyurethane
( in 120°C to 300°C ); and
↓
sublimation printing.
F I G . 8

METHOD OF MAKING MOUSE PAD

TECHNICAL FIELD

The present disclosure relates to a method of making a mouse pad by which the body is made of polyurethane (PU) and is hot-press molded to have a high density, obtain a flat and smooth peripheral side of the mouse pad, and avoid odor.

BACKGROUND

FIG. 12 is a flow chart of a conventional method of making a conventional mouse pad. FIG. 13 is a perspective view of the conventional mouse pad. The foaming layer 40 includes a fiber cloth adhered thereon and then the foaming layer is cut and trimmed to form a peripheral fringe 42. Finally, the foaming layer is printed to produce the mouse pad.

However, such a conventional mouse pad will produce odor from the foaming layer 40, dirt will accumulate around the peripheral fringe 42, and the peripheral fringe 42 is not flat and smooth to cause foreign body sensation.

FIG. 14 is a flow chart of anther conventional method of making the conventional mouse pad. FIG. 15 is a perspective view of another conventional mouse pad. After cutting a rubber layer 50, a fiber cloth 51 is adhered on the rubber layer 50 to produce the mouse pad, then the mouse pad is printed.

Nevertheless, the rubber layer 50 will have odor since chemicals (e.g. sulfur) is added. Also, the rubber layer 50 cannot be trimmed to injure a user easily.

The present invention has arisen to mitigate and/or obviate the afore-described disadvantages.

SUMMARY

A primary aspect of the present invention is to provide a method of making a mouse pad by which the body is made of polyurethane (PU) and is hot-press molded to have a high density, obtain a flat and smooth peripheral side of the mouse pad, and avoid odor.

To obtain above-mentioned aspect, a method of making a mouse pad provided by the present invention contains: a body on which a cloth is adhered, and the body and the cloth are hot-press molded by using a first mold and a second mold to produce the mouse pad. A size of a cavity of the second mold is equal to a predetermined size of the body, and a guide rib surrounds the cavity. The body and the cloth are adhered and are placed into the cavity of the second mold, then the hot-press molding machine is turned on so that the first mold and the second mold to be hot-press molded for one time or two times, such that a trimmed fringe is formed around the body and the cloth by using the guide rib, thus having a high density, thus obtaining a flat and smooth peripheral side of the mouse pad, and avoiding odor.

The body is made of polyurethane (PU).

The body is made of recycling polyurethane or is added composite materials therein.

The cloth is made of knitted fabric or plain woven fabric.

The first mold and the second mold are heated to 120° C. to 300° C. to hot-press mold the body and the cloth.

Other objects and features will be in part apparent and in part pointed out hereinafter.

BRIEF DESCRIPTION OF THE DRAWINGS

FIG. 8 is a flow chart of the method of making the mouse pad according to a second embodiment of the present invention.

DETAILED DESCRIPTION

Figure 1:
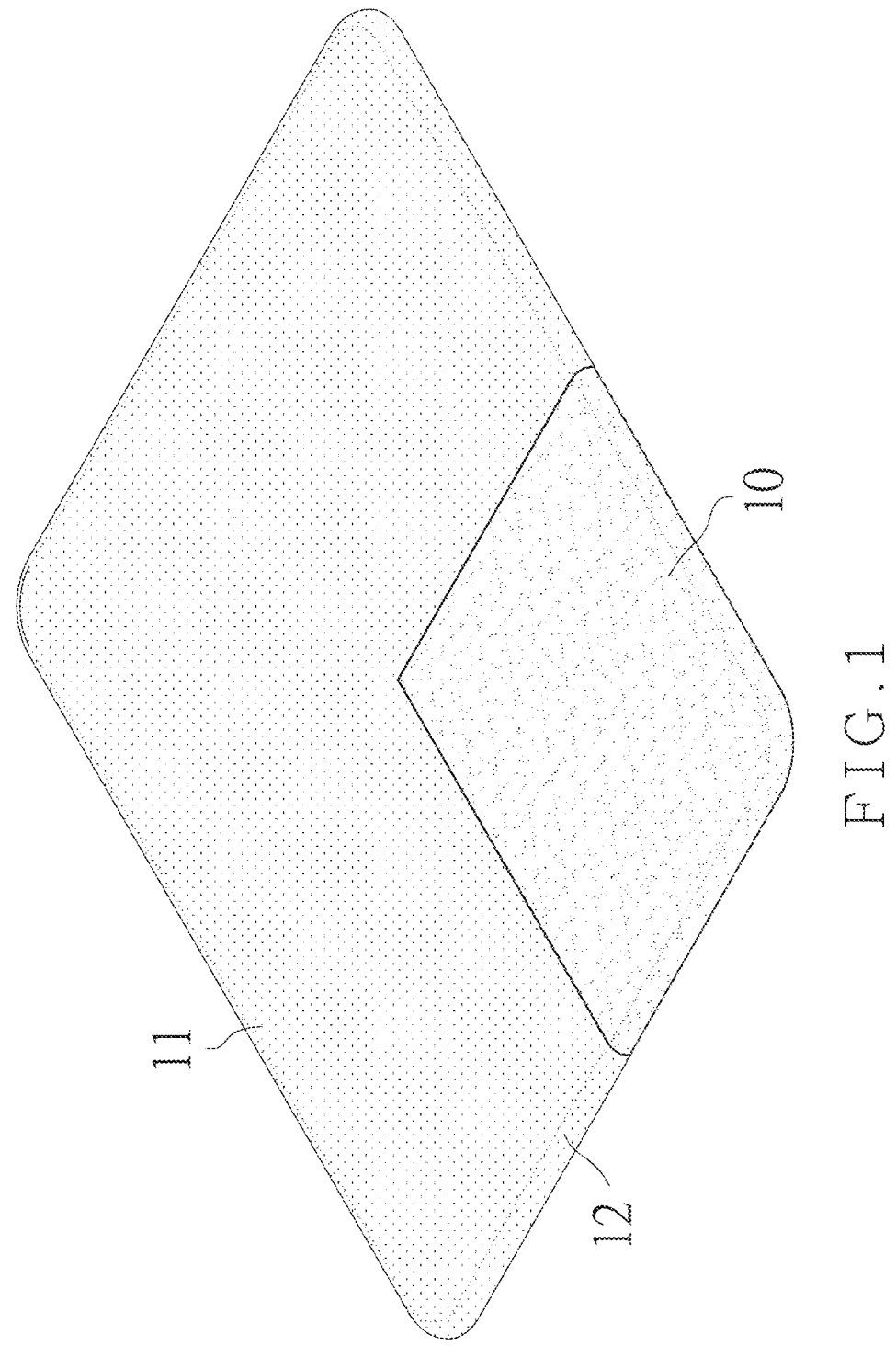
FIG. 1 is a cross-sectional perspective view showing the assembly of a part of making a mouse pad according to the present invention.
Figure 2:
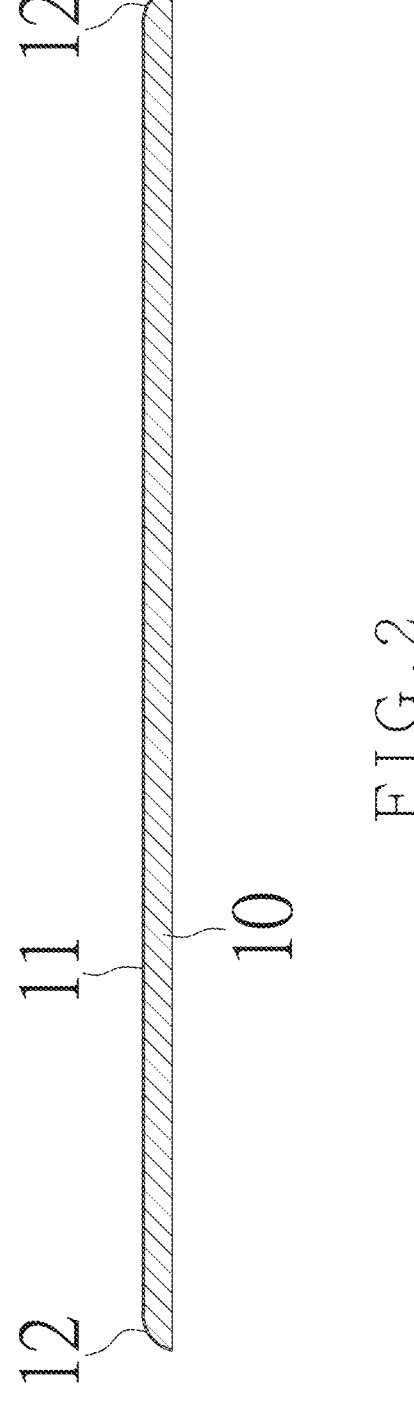
FIG. 2 is a cross sectional view showing the assembly of making the mouse pad according to the present invention.
Figure 3:
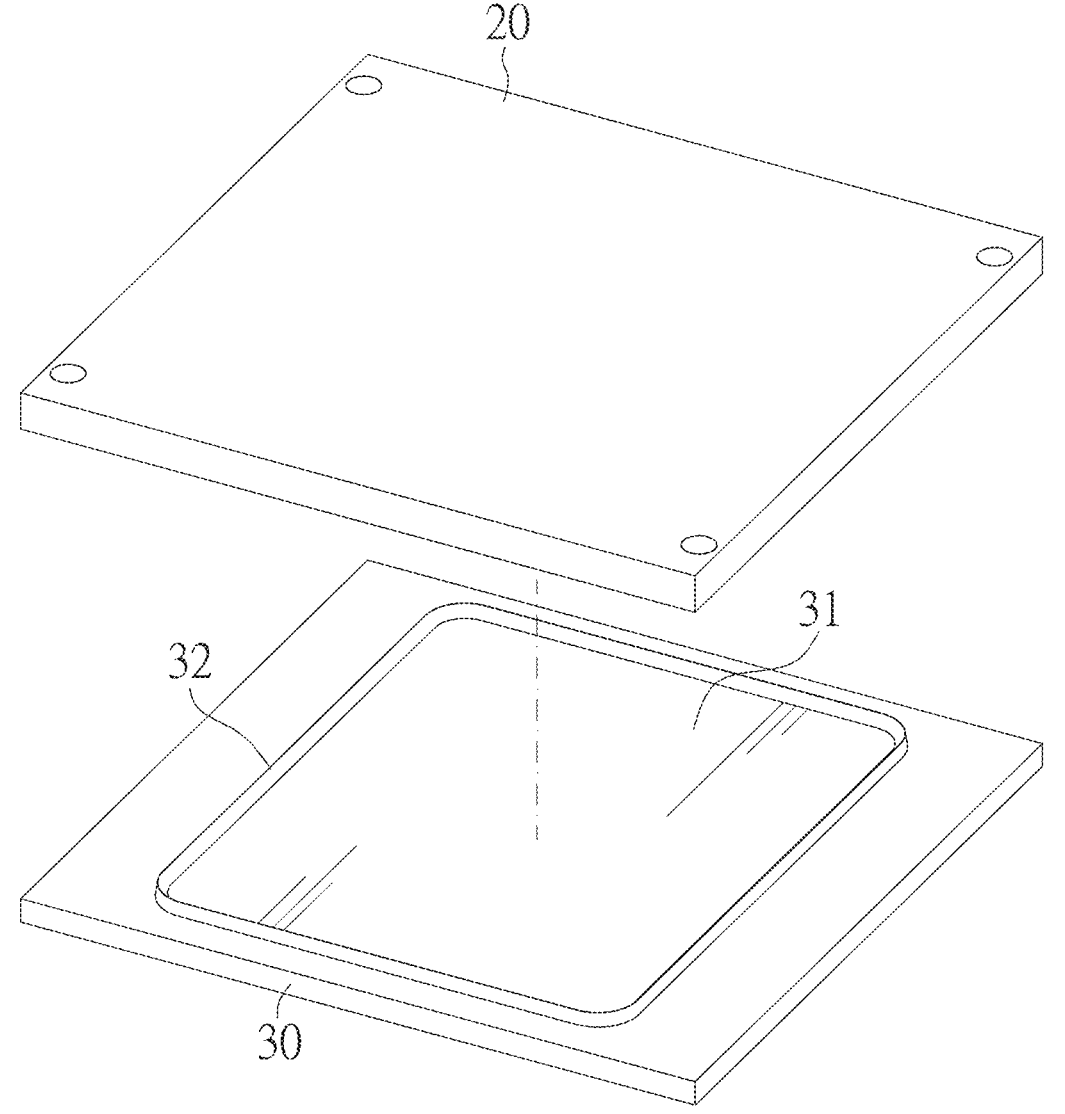
FIG. 3 is a perspective view showing the exploded components of making the mouse pad according to the present invention.
Figure 4:
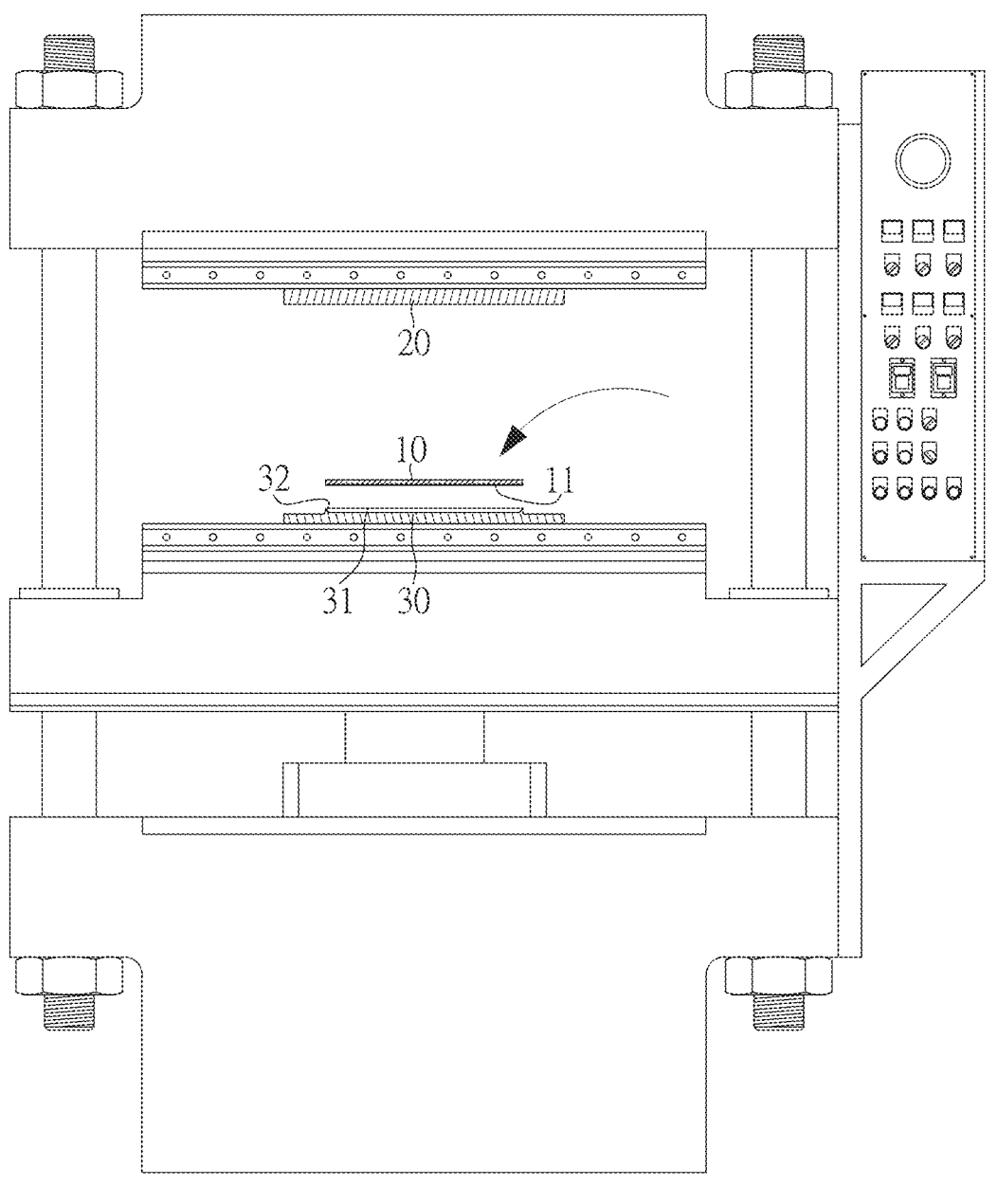
FIG. 4 is a side plan view showing the operation of making the mouse pad according to the present invention.
Figure 5:
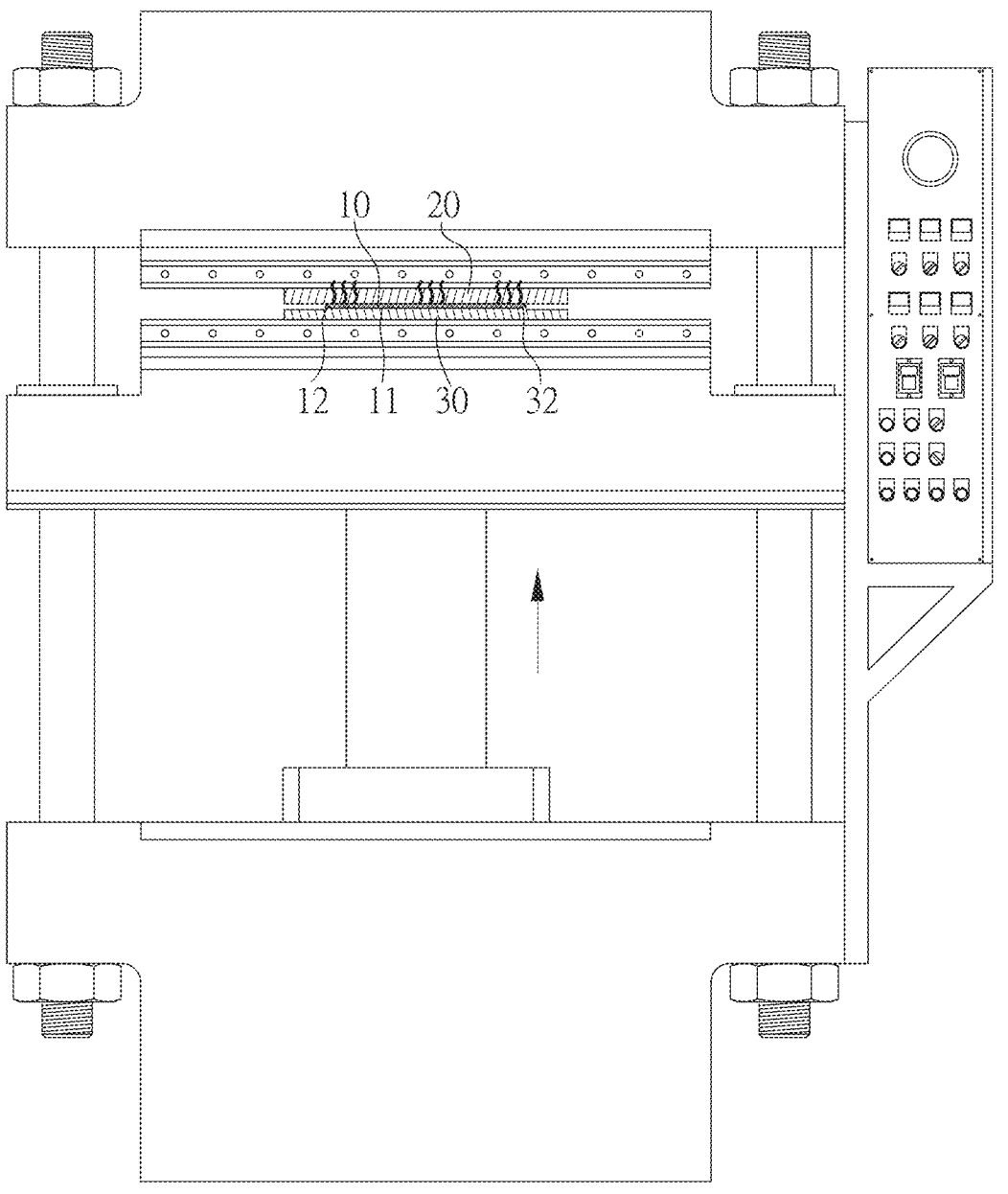
FIG. 5 is another side plan view showing the operation of making the mouse pad according to the present invention.
Figure 6:
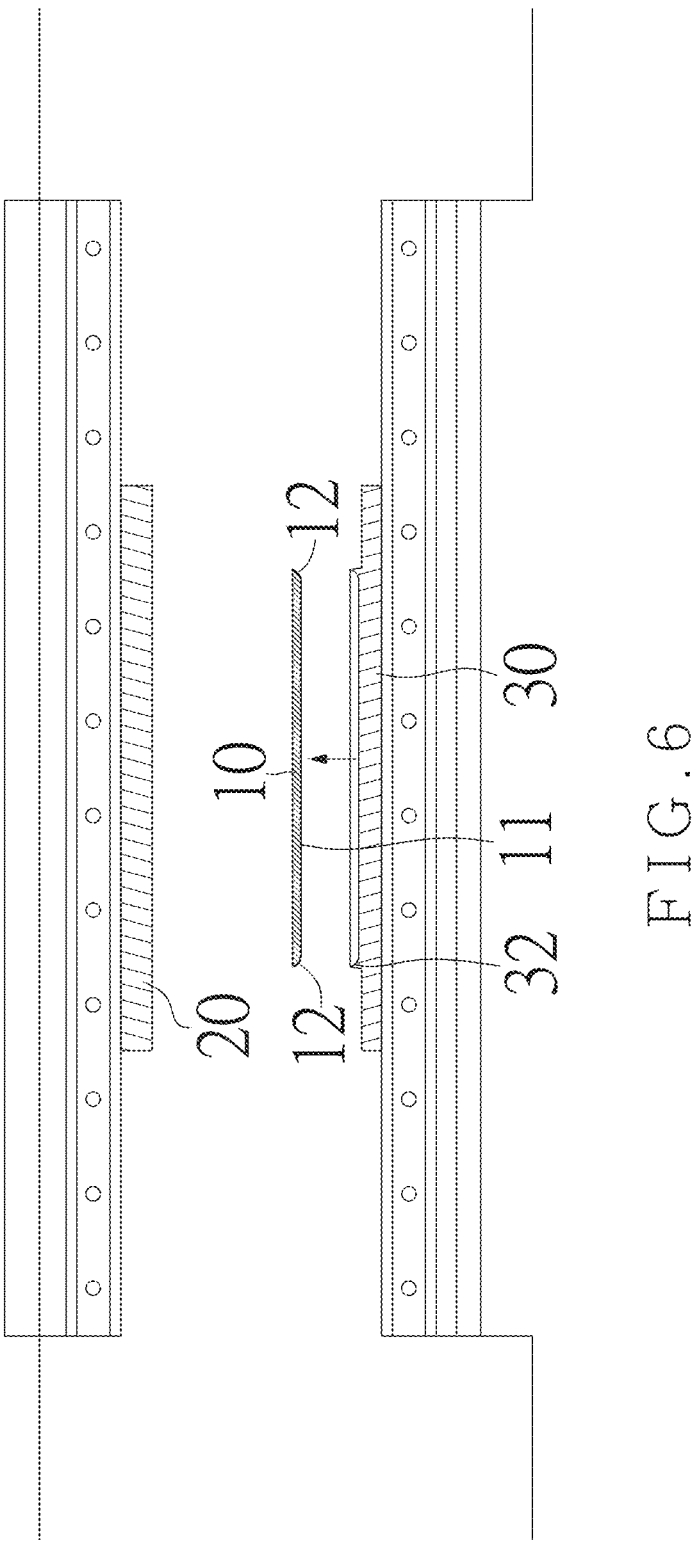
FIG. 6 is also another side plan view showing the operation of making the mouse pad according to the present invention.
Figure 7:
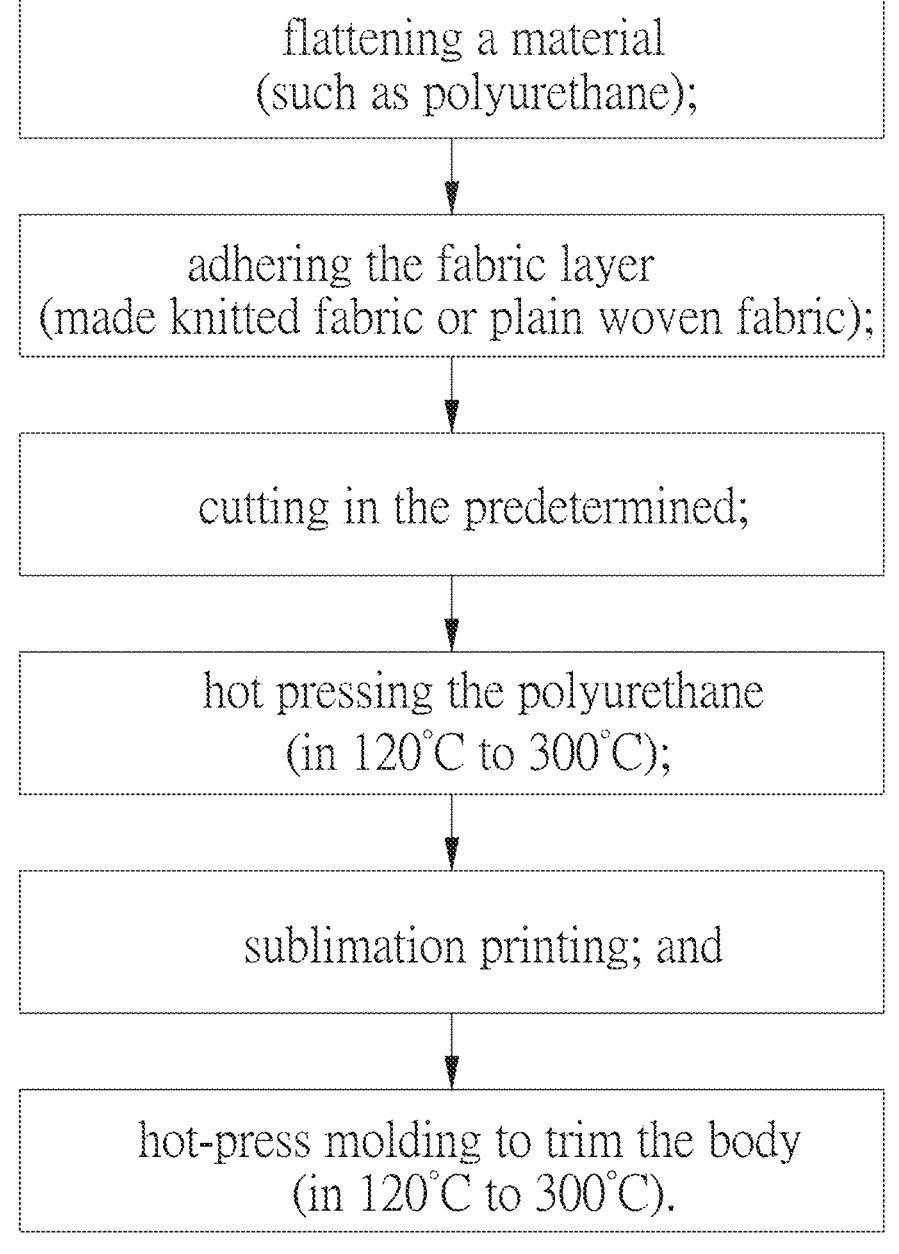
FIG. 7 is a flow chart of the method of making the mouse pad according to a first embodiment of the present invention.

FIG. 1 is a cross-sectional perspective view showing the assembly of a part of making a mouse pad according to the present invention. FIG. 2 is a cross sectional view showing the assembly of making the mouse pad according to the present invention. FIG. 3 is a perspective view showing the exploded components of making the mouse pad according to the present invention. With reference to FIGS. 1-3, the mouse pad according to the present invention comprises: a body 10 and a cloth 11 which are adhered, and then the body 10 and the cloth 11 are hot-press molded by using a first mold 20 and a second mold 30; wherein the body 10 is made of polyurethane (PU) and is cut in a predetermined size based on using requirements;

the cloth 11 is made of knitted fabric or plain woven fabric and is cut based on the predetermined size of the body 10, wherein the cloth 11 is adhered on the body 10 and is hot-press molded with the body 10 by using the first mold 20 and the second mold 30;

The first mold 20 is fixed on an upper portion of a hot-press molding machine;

The second mold 30 is mounted on a lower portion of the hot-press molding machine, wherein the second mold 30 includes a cavity 31, and a size of the cavity 31 of the second mold 30 is equal to the predetermined size of the body 10, and a guide rib 32 surrounds the cavity 31 and formed in an arc shape or a hypotenuse shape, the body 10 and the cloth 11 are adhered and are placed into the cavity 31 of the second mold 30, as shown in FIG. 4, then the hot-press molding machine is turned on so that the first mold 20 and the second mold 30 are heated to 120° C. to 300° C., and the first mold 20 hot-press molded on the second mold 30 as shown in FIG. 5, such that a trimmed fringe 12 is formed around the body 10 and the cloth 11, and the hot-press molding machine is turned off to demold the first mold 20, then the mouse pad is removed from the first mold 20, as illustrated in FIG. 6;

FIG. 7 is a flow chart of the method of making the mouse pad according to a first embodiment of the present invention. The method of making the mouse pas comprises steps of:

1) flattening a material (such as polyurethane);
2) bonding cloth (made knitted fabric or plain woven fabric);
3) cutting in the predetermined;
4) hot pressing the polyurethane (in 120° C. to 300° C.);
5) sublimation printing; and
6) hot-press molding to trim the body (in 120° C. to 300° C.).

Referring to FIG. 8, a method of making a mouse pad according to a second embodiment of the present invention comprises steps of:

1) flattening a material (such as polyurethane);
2) bonding cloth (made of knitted fabric or plain woven fabric);
3) cutting in the predetermined size;
4) hot pressing the polyurethane (in 120° C. to 300° C.); and
5) sublimation printing.

Figure 9:
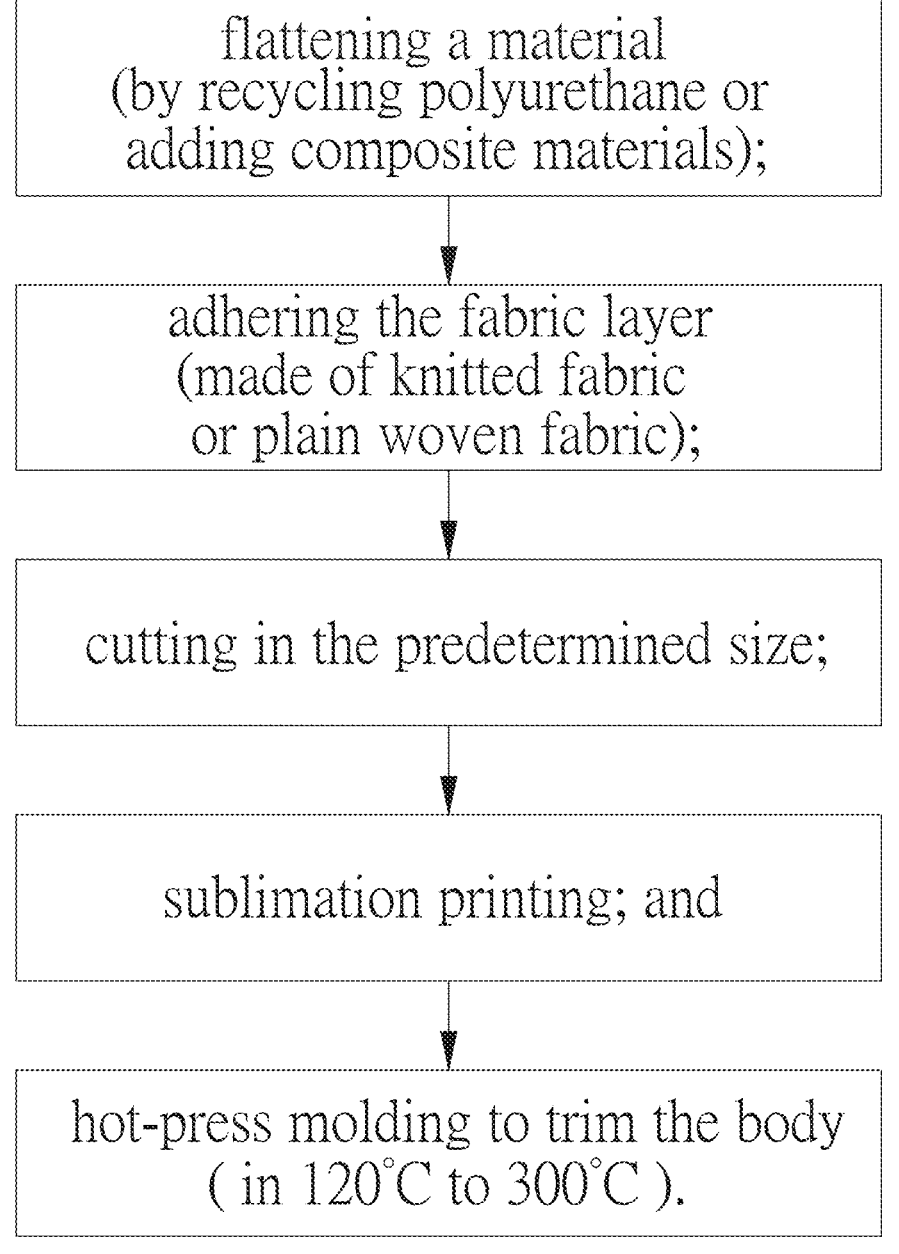
FIG. 9 is a flow chart of the method of making the mouse pad according to a third embodiment of the present invention.

As shown in FIG. 9, a method of making a mouse pad according to a second embodiment of the present invention comprises steps of:

1) flattening a material (by recycling polyurethane or adding composite materials);
2) bonding cloth (made of knitted fabric or plain woven fabric);
3) cutting in the predetermined size;
4) sublimation printing; and
5) hot-press molding to trim the body (in 120° C. to 300° C.).

Figure 10:
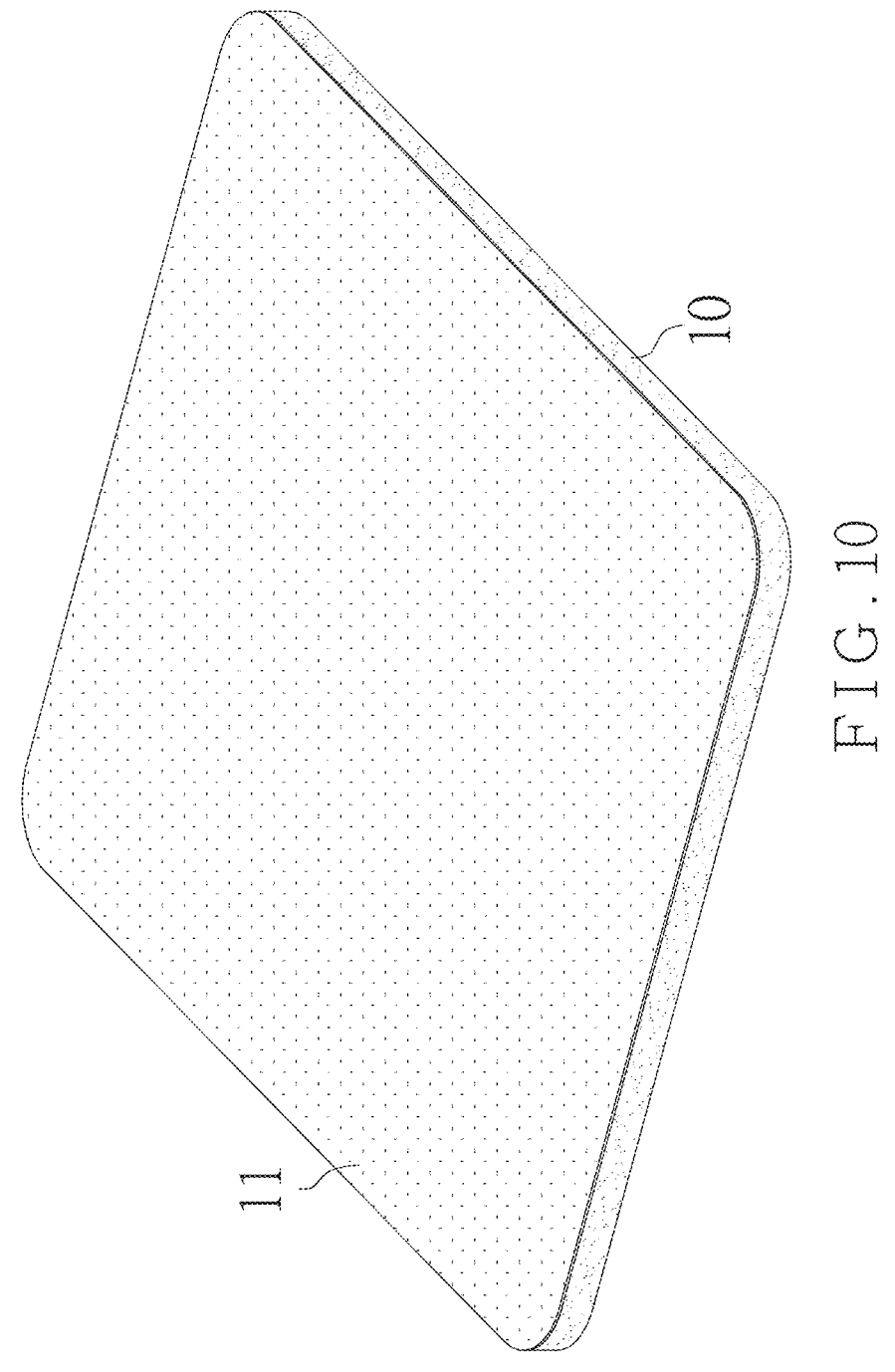
FIG. 10 is a perspective view showing the application of the method of making the mouse pad according to a first embodiment of the present invention.
Figure 11:
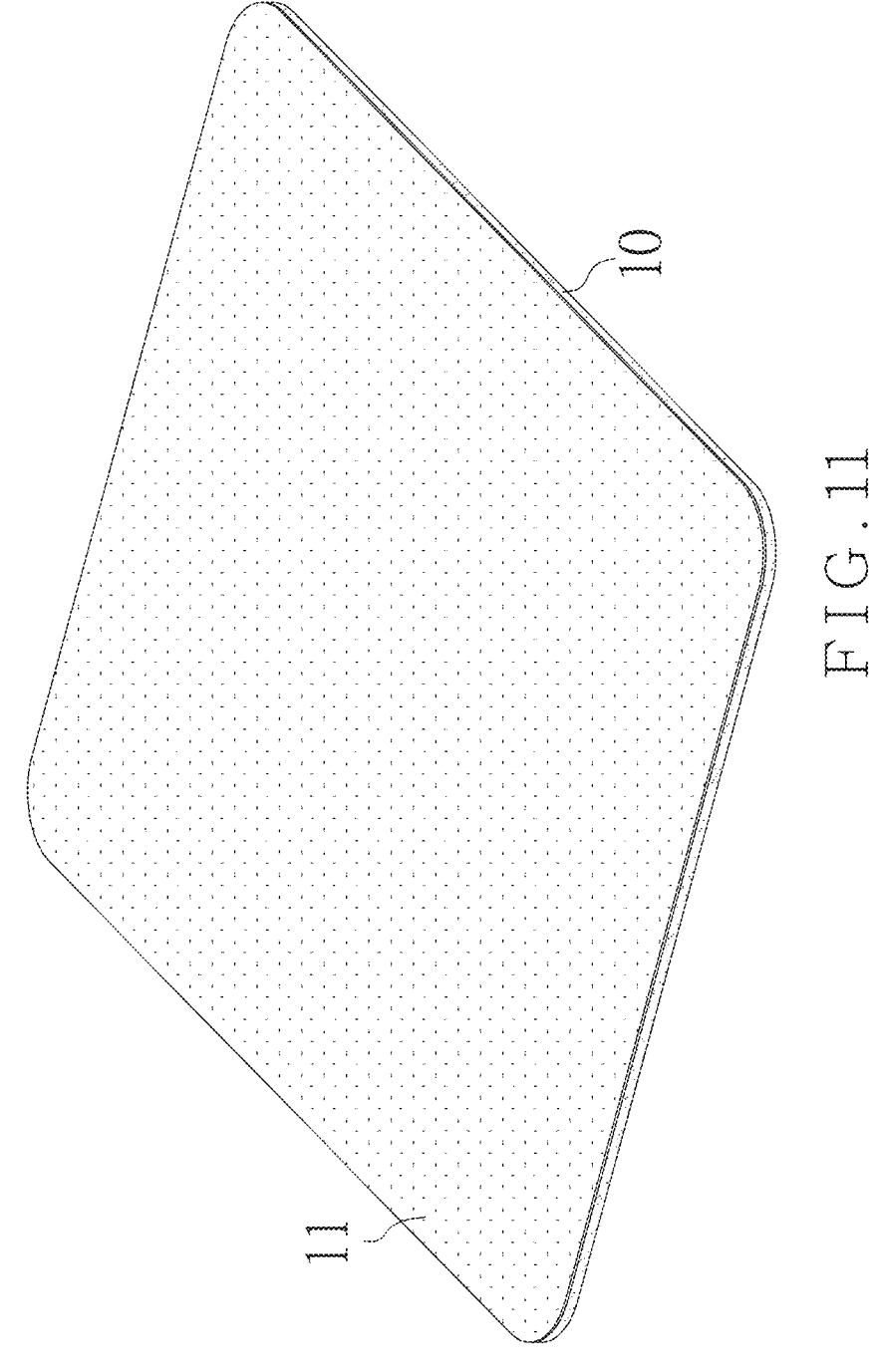
FIG. 11 is another perspective view showing the application of the method of making the mouse pad according to a first embodiment of the present invention.
Figure 12:
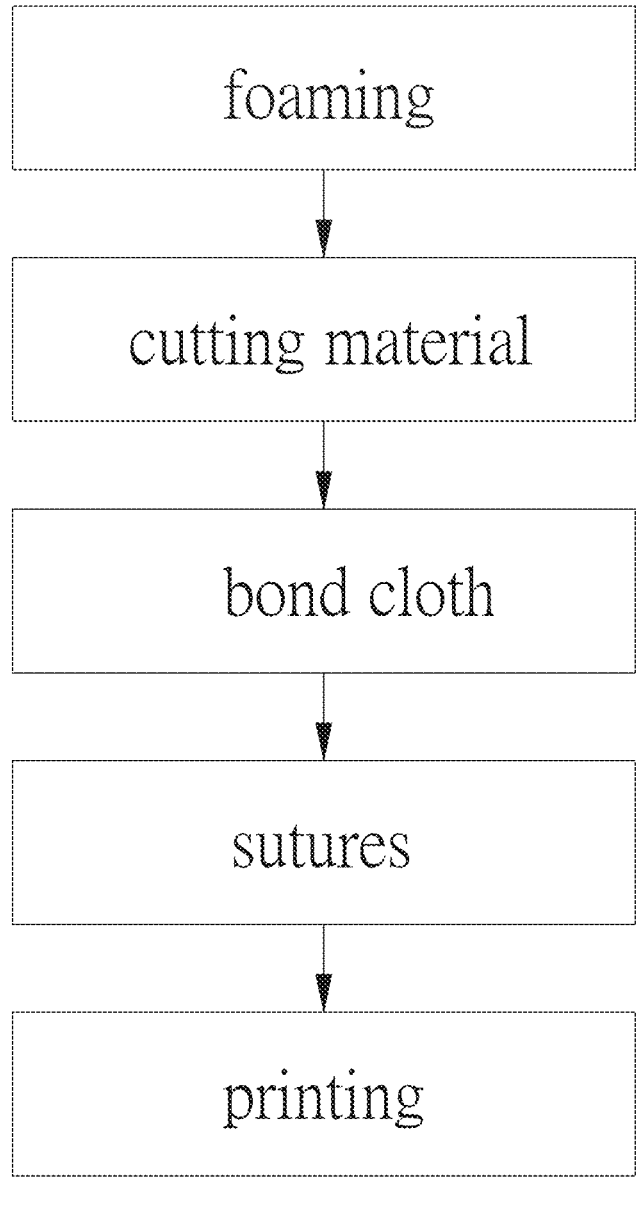
FIG. 12 is a flow chart of a conventional method of making a conventional mouse pad.
Figure 13:
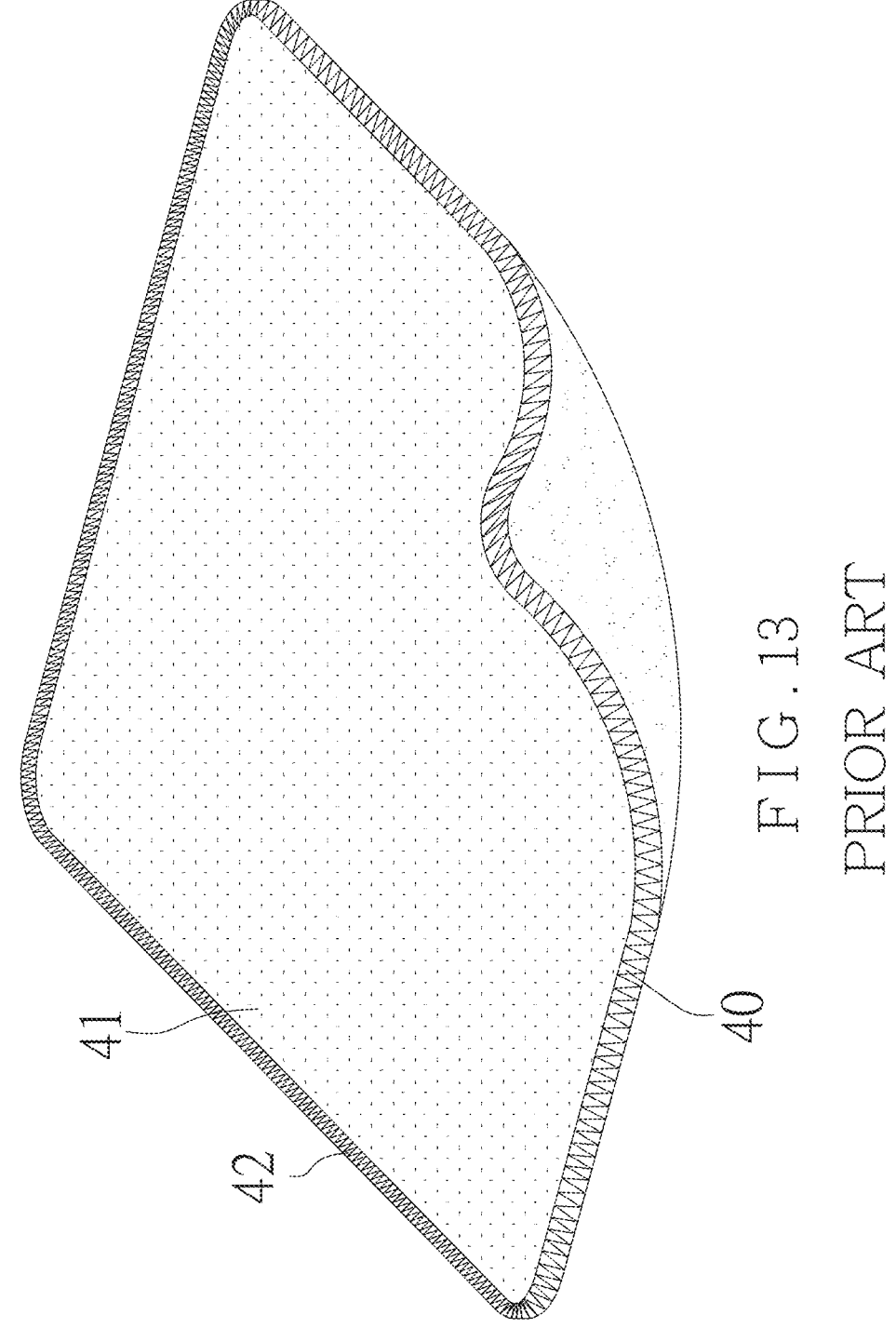
FIG. 13 is a perspective view of the conventional mouse pad.
Figure 14:
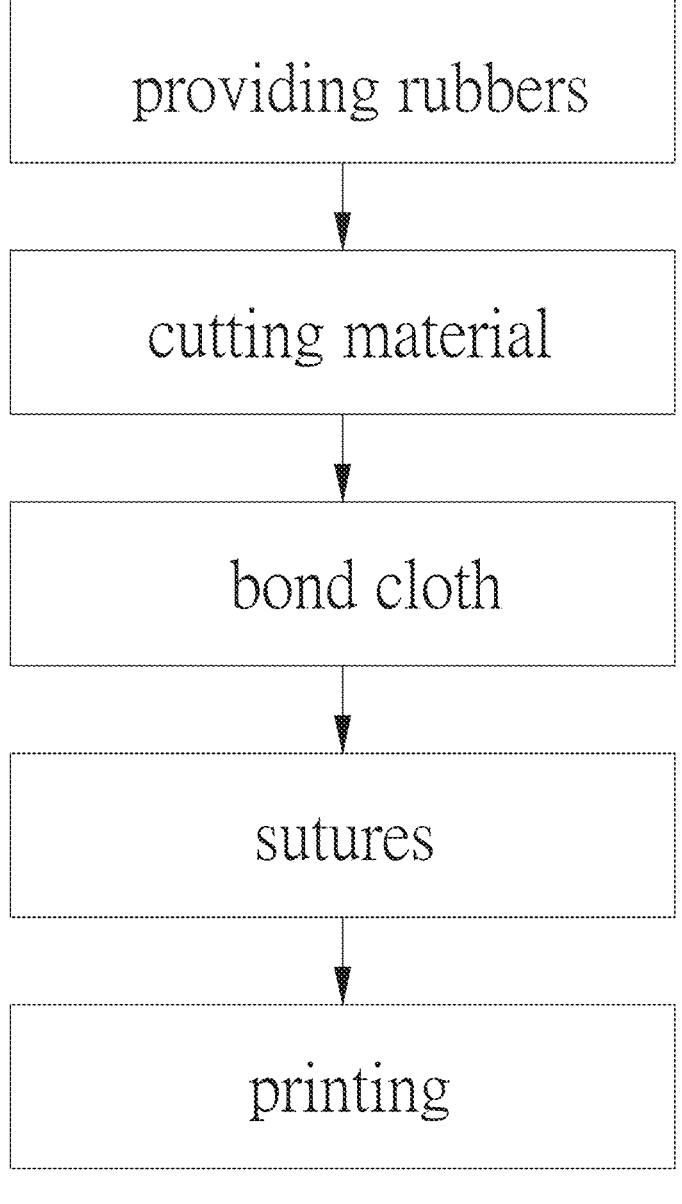
FIG. 14 is a flow chart of anther conventional method of making another conventional mouse pad.
Figure 15:
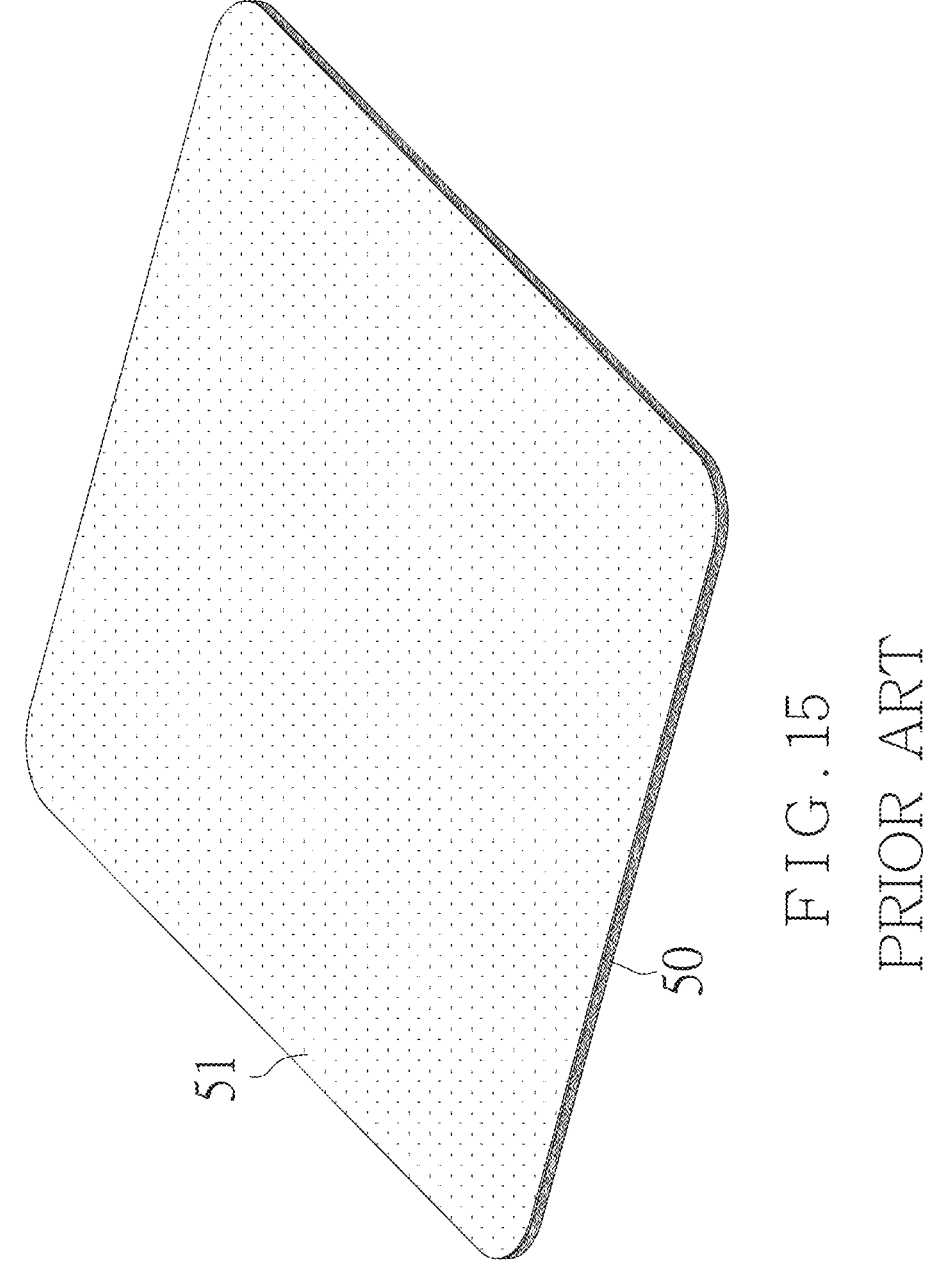
FIG. 15 is a perspective view of another conventional mouse pad.

FIG. 10 is a perspective view showing an application of the method of making the mouse pad according to the present invention. FIG. 11 is a perspective view showing another application of the method of making the mouse pad according to the present invention.

Thereby, the body 10 is made of polyurethane (PU) and is hot-press molded to have a high density, obtain a flat and smooth peripheral side of the mouse pad, and avoid odor.

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of making a mouse pad, comprising:
providing a body made of polyurethane (PU);
bonding a cloth on the body;
cutting the body in a predetermined size;
hot pressing the body and the cloth;
sublimation printing; and
hot-press molding to trim the body by using a first mold and a second mold;
wherein the second mold includes a cavity, a size of the cavity of the second mold is equal to the predetermined size of the body, and a guide rib surrounds the cavity, such that a trimmed fringe is formed around the body and the cloth by using the guide rib during the hot-press molding.

2. The method as claimed in claim 1, wherein the guide rib is formed in an arc shape or a hypotenuse shape.

3. The method as claimed in claim 1, wherein the cloth is made of knitted fabric or plain woven fabric.

4. A method of making a mouse pad, comprising:
providing a body made of polyurethane (PU);
bonding a cloth on the body;
cutting the body in a predetermined size;
sublimation printing; and
hot-press molding to trim the body by using a first mold and a second mold;
wherein the second mold includes a cavity, a size of the cavity of the second mold is equal to the predetermined size of the body, and a guide rib surrounds the cavity, such that a trimmed fringe is formed around the body and the cloth by using the guide rib during the hot-press molding.

5. The method as claimed in claim 4, wherein the guide rib is formed in an arc shape or a hypotenuse shape.

6. The method as claimed in claim 4, wherein the cloth is made of knitted fabric or plain woven fabric.

7. A method of making a mouse pad, comprising:
providing a body made of polyurethane (PU);
bonding a cloth on the body;
cutting the body in a predetermined size;
hot pressing the body; and
sublimation printing;
wherein the hot pressing is performed by using a first mold and a second mold, the second mold includes a cavity, a size of the cavity of the second mold is equal to the predetermined size of the body, and a guide rib surrounds the cavity, such that a trimmed fringe is formed around the body and the cloth by using the guide rib during the hot pressing.

8. The method as claimed in claim 7, wherein the cloth is made of knitted fabric or plain woven fabric.

* * * * *